(12) United States Patent
Mirsepassi et al.

(10) Patent No.: US 11,385,401 B2
(45) Date of Patent: Jul. 12, 2022

(54) MULTI-CORE OPTICAL FIBER WITH REDUCED BUBBLE FORMATION

(71) Applicant: Alcon Inc., Fribourg (CH)

(72) Inventors: Alireza Mirsepassi, Irvine, CA (US); Dean Richardson, Aliso Viejo, CA (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 17/109,409

(22) Filed: Dec. 2, 2020

(65) Prior Publication Data

US 2021/0173142 A1 Jun. 10, 2021

Related U.S. Application Data

(60) Provisional application No. 62/943,352, filed on Dec. 4, 2019.

(51) Int. Cl.
*G02B 6/02* (2006.01)
*G02B 6/028* (2006.01)

(52) U.S. Cl.
CPC ......... *G02B 6/02042* (2013.01); *G02B 6/028* (2013.01)

(58) Field of Classification Search
CPC ............................ G02B 6/02042; G02B 6/028; C03B 2201/12; C03B 2201/14; C03B 2201/31; C03B 2203/34; Y02P 40/57
See application file for complete search history.

(56) References Cited

U.S. PATENT DOCUMENTS

| | | | |
|---|---|---|---|
| 5,778,129 A | 7/1998 | Shukunami et al. |
| 5,921,981 A | 7/1999 | Bahmanyar et al. |
| 6,535,679 B2 | 3/2003 | Yokoyama et al. |
| 7,189,226 B2 | 3/2007 | Auld et al. |
| 7,618,177 B2 | 11/2009 | Cazzini |
| 8,277,048 B2 | 10/2012 | Artsyukhovich |
| 8,398,240 B2 | 3/2013 | Smith |
| 8,488,930 B2 | 7/2013 | Papac et al. |
| 8,620,126 B2 | 12/2013 | Rajala et al. |
| 8,951,244 B2 | 2/2015 | Smith |
| 8,971,684 B2 | 3/2015 | Tanigawa et al. |

(Continued)

FOREIGN PATENT DOCUMENTS

| | | |
|---|---|---|
| EP | 2107401 B1 | 8/2014 |
| EP | 3333604 A1 | 6/2018 |

(Continued)

OTHER PUBLICATIONS

Alcon Global Vitreoretinal Product Catalog, 2014, pp. 25-40.

(Continued)

*Primary Examiner* — John Bedtelyon

(57) ABSTRACT

The present disclosure relates to a MCF, including a plurality of cores, an outer cladding or tube, diffusion barriers, and claddings. The diffusion barriers and claddings are designed so that unwanted migration of dopants from the inner cladding to the outer cladding or tube is reduced, or that unwanted migration of dopants from the cores to the outer cladding or tube is reduced. The doping levels of the various components of the MCF can be controlled in order to reduce dopant migration. The reduction in dopant gradients reduces the migration of dopants and bubbles to the interfaces between the inner claddings, the outer cladding or tube, and the cores.

19 Claims, 3 Drawing Sheets

(56) References Cited

U.S. PATENT DOCUMENTS

| | | |
|---|---|---|
| 9,052,433 B2 | 6/2015 | Dianov et al. |
| 9,055,885 B2 | 6/2015 | Horvath et al. |
| 9,795,505 B2 | 10/2017 | Yu et al. |
| 10,016,248 B2 | 7/2018 | Mirsepassi |
| 10,101,526 B2 * | 10/2018 | Sasaki ............... G02B 6/02023 |
| 10,245,181 B2 | 4/2019 | Diao et al. |
| 10,413,446 B2 | 9/2019 | Bouch et al. |
| 10,639,198 B2 | 5/2020 | Farley |
| 2013/0294737 A1 | 11/2013 | Dianov et al. |
| 2016/0075591 A1 | 3/2016 | Bookbinder et al. |
| 2018/0055596 A1 | 3/2018 | Johnson |
| 2018/0244557 A1 | 8/2018 | Nagashima et al. |
| 2019/0142544 A1 | 5/2019 | Horn et al. |
| 2019/0175405 A1 | 6/2019 | Diao et al. |
| 2020/0375660 A1 | 12/2020 | Lassalas et al. |
| 2020/0390603 A1 | 12/2020 | Diao et al. |
| 2020/0397614 A1 | 12/2020 | Diao et al. |
| 2021/0173143 A1 | 6/2021 | Diao et al. |

FOREIGN PATENT DOCUMENTS

| | | |
|---|---|---|
| JP | 63313103 A | 12/1988 |
| JP | 63313104 A | 12/1988 |
| JP | 09005541 A | 1/1997 |
| JP | 09005542 A | 1/1997 |
| JP | 09061645 A | 3/1997 |
| JP | 09090144 A | 4/1997 |
| JP | 09090145 A | 4/1997 |
| JP | 2013020207 A | 1/2013 |
| JP | 5924083 B2 | 4/2016 |
| WO | 02096817 A1 | 12/2002 |

OTHER PUBLICATIONS

Jens, Kobelke, et al., "Diffusion and Interface Effects during Preparation of All-Solid Microstructured Fibers" Materials 2014, 7, pp. 6879-6892.

"Highly Fluorine Doped Tubes", Heraeus Quarzglas GmbH & Co. KG, dated Apr. 2018 (2 pages).

* cited by examiner

MULTI-CORE OPTICAL FIBER WITH REDUCED BUBBLE FORMATION

PRIORITY CLAIM

This application claims the benefit of priority of U.S. Provisional patent Application Ser. No. 62/943,352 titled "MULTI-CORE OPTICAL FIBER WITH REDUCED BUBBLE FORMATION," filed on Dec. 4, 2019, whose inventors are Alireza Mirsepassi and Dean Richardson, which is hereby incorporated by reference in its entirety as though fully and completely set forth herein.

DESCRIPTION OF THE RELATED ART

In a wide variety of medical procedures, laser light is used to assist the procedure and treat patient anatomy. For example, in laser photocoagulation, a laser probe is used to cauterize blood vessels at laser burn spots across the retina. Certain types of laser probes burn multiple spots at a time, which may result in faster and more efficient photocoagulation. Some of these multi-spot laser probes split a single laser beam into multiple laser beams that exhibit a laser spot pattern and deliver the beams to an array of optical fibers that exhibit a corresponding fiber pattern. Typically, the fibers should be tightly packed together so that the fiber pattern matches the laser spot pattern. Moreover, the laser spot pattern should be accurately aligned with the fiber pattern.

The fibers can include an outer cladding and a plurality of cores, constituting a multi-core optical fiber (MCF). The cores, outer cladding, or both, can be designed such that the components of the fiber transport light. To create the MCF, holes are typically drilled into the outer cladding, and cores are consolidated within the drilled holes. Often, dopants, such as fluorine or germanium, are added to the cores and the outer cladding, as the dopants create the required refractive index profile to support light guiding properties of the MCF. Finally, the outer cladding is drawn at an elevated temperature to a desired diameter and length, resulting in the MCF.

One drawback of MCFs is that dopants can diffuse from the outer cladding to the core and vice versa, which materially changes the optical properties of the components of the MCF. In addition, dopant gradients can cause dopant diffusion, and under high temperature gas bubbles may form in the making of MCFs towards interfaces between the cores and the outer cladding. The gas bubbles reduce the yield of MCFs and weaken the MCF, leading to fragile fibers. Also, the gas bubbles degrade the optical performance of the MCF.

SUMMARY

According to one embodiment, the present disclosure is directed to a multi-core optical fiber, including a plurality of cores including a first material, an outer cladding surrounding the cores, the outer cladding including the first material, and a diffusion reduction feature, wherein the diffusion reduction feature reduces migration of a first dopant between the outer cladding and another element in the MCF.

Another embodiment is directed to a multi-core optical fiber, including a rod including a first material, a rod inner cladding surrounding the rod, the rod including the first material and a first dopant, a plurality of cores including the first material, a plurality of inner claddings surrounding the cores, the inner claddings including the first material and the first dopant, a first portion of each of the inner claddings interfacing with a portion of the rod inner cladding, and an outer tube including the first material and the first dopant, a second portion of each of the inner claddings interfacing with a portion of the outer tube.

A further embodiment is directed to a multi-core optical fiber, including a rod including a first material, a plurality of cores including the first material and a first dopant, a plurality of diffusion barriers surrounding the cores, the diffusion barriers including the first material, a first portion of each of the diffusion barriers interfacing with a portion of the rod, and an outer tube including the first material, a second portion of each of the diffusion barriers interfacing with a portion of the outer tube.

The various embodiments of the present disclosure can also include one or more of the following features. The concentration of the first dopant in the outer cladding is reduced in comparison to an MCF without the diffusion reduction feature. The dopant concentration gradient between the outer cladding and the another element is reduced in comparison to an MCF without the diffusion reduction feature. The MCF further includes a plurality of inner claddings surrounding the cores, the plurality of inner claddings including the first material and the first dopant. The diffusion reduction feature includes a plurality of diffusion barriers surrounding the inner claddings, the diffusion barriers including the first material. The diffusion reduction feature includes a highly-doped region of the plurality of inner claddings doped with the first dopant, a lightly-doped region of the plurality of inner claddings doped with the first dopant, where the dopant concentration of the lightly doped region is lower than the dopant concentration of the highly-doped region, the lightly-doped region surrounding the highly-doped region. The numerical aperture (NA) of the highly-doped region with respect to the core is from about 0.18 to about 0.28, and the NA of the lightly-doped region with respect to the core is from about 0.08 to about 0.18. The first dopant includes fluorine (F), boron (B), or chlorine (Cl). The diffusion reduction feature includes the outer cladding with a first dopant concentration. The concentration of the first dopant in the outer cladding is less than the concentration of the first dopant in the plurality of inner claddings. The diffusion reduction feature includes a plurality of diffusion barriers surrounding the cores, and the diffusion barriers include the first material. The plurality of cores are doped with the first dopant, and the another element is the plurality of cores. The first dopant increases the refractive index of the first material. The first dopant includes germanium (Ge) or phosphorus (P). The concentration gradient of the first dopant between the outer tube and the rod is reduced in comparison to an MCF without a rod inner cladding. The gradient of the first dopant between the outer tube and the plurality of cores is reduced in comparison to an MCF without a plurality of diffusion barriers.

The cores are surrounded by a variety of claddings and diffusion barriers. The claddings and diffusion barriers reduce and slow the migration of dopants and subsequent bubble formation. The claddings and diffusion barriers decrease the dopant gradient in the MCF, increasing MCF yield per amount of material, and resulting in MCF's with improved material and optical properties.

BRIEF DESCRIPTION OF THE DRAWINGS

For a more complete understanding of the present technology, its features, and its advantages, reference is made to the following description, taken in conjunction with the accompanying drawings, in which.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

In the following description, details are set forth by way of example to facilitate an understanding of the disclosed subject matter. It should be apparent to a person of ordinary skill in the field, however, that the disclosed implementations are exemplary and not exhaustive of all possible implementations. Thus, it should be understood that reference to the described example is not intended to limit the scope of the disclosure. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation can be combined with the features, components, and/or steps described with respect to other implementations of the present disclosure.

In certain embodiments, the term "about" refers to a +/−10% variation from the nominal value. It is to be understood that such a variation can be included in any value provided herein.

Embodiments provided herein generally relate to a MCF with a diffusion reduction feature for reducing unwanted migration of dopants.

Figure 1A:
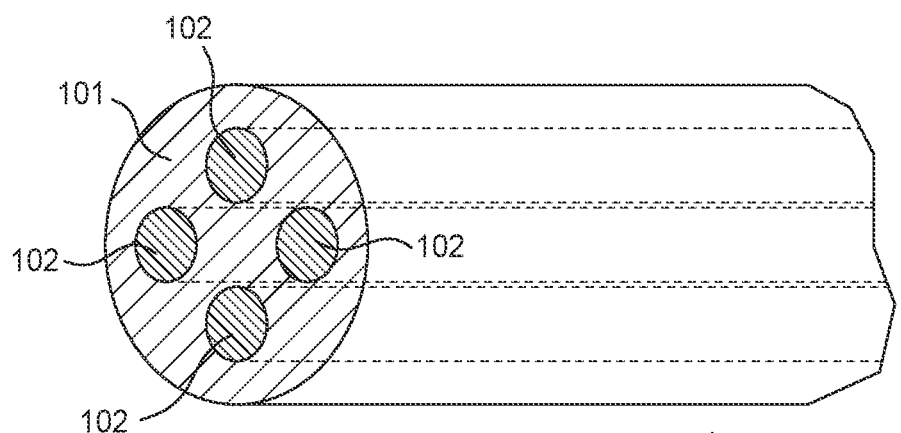
FIG. 1A illustrates a perspective view of a distal end of a multi-core optical fiber (MCF), in accordance with an embodiment of the present disclosure.
Figure 1B:
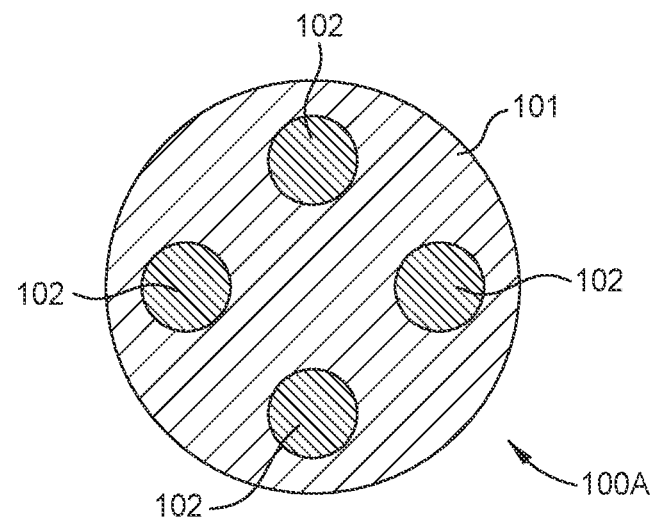
FIG. 1B illustrates a front view of the distal end of the MCF of FIG. 1A, in accordance with a particular embodiment of the present disclosure.
Figure 1C:
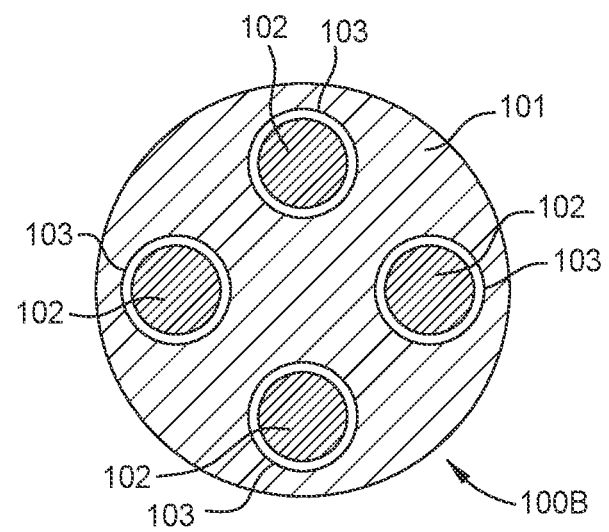
FIG. 1C illustrates a front view of the distal end of a MCF with a plurality of inner claddings, in accordance with a particular embodiment of the present disclosure.

FIGS. 1A-1C illustrate various examples of MCFs. More specifically, FIGS. 1A and 1B illustrate a MCF without inner claddings while FIG. 1C illustrates an example of a MCF that includes inner claddings. Note that although not shown, MCFs are typically placed in a polyvinyl chloride (PVC) tube to create a MCF cable.

FIG. 1A illustrates a perspective view of a distal end of a MCF 100A. The MCF 100A can be cylindrically shaped, although other shapes are contemplated.

FIG. 1B illustrates a front view of the distal end of the MCF 100A of FIG. 1A. As shown, the MCF 100A includes an outer cladding 101 and a plurality of cores 102. The plurality of cores 102 may be made of any transparent material, such as fused silica or glass. In the example of FIGS. 1A and 1B, the cores 102 are doped fused silica. For example, the cores 102 may be germanium-doped fused silica. Doping cores 102 with germanium, or a similar dopant, helps with increasing the refractive index of the core compared to the fused silica of the outer cladding 101 and hence creating light guiding properties within the core.

FIG. 1C illustrates a front view of the distal end of a MCF 100B, including a plurality of inner claddings 103. As shown, the MCF 100B includes an outer cladding 101, a plurality of cores 102, and a plurality of inner claddings 103. In contrast to MCF 100A, in the example of FIG. 1C, the cores 102 of MCF 100B are not doped, and are made of fused silica or a similar transparent material. Each of the cores 102 is surrounded by an inner cladding 103. The inner claddings 103 may include doped fused silica. In some embodiments, the inner claddings 201 are doped with a dopant that reduces the refractive index of the inner claddings, such as fluorine (F), chlorine (Cl), or boron (B), according to some embodiments. The inner claddings 103, as doped, have a lower refractive index than the cores 102, thereby creating light guiding properties within each core 102. The thickness of the inner claddings 103 vary from about 1 μm to about 10 μm with a core diameter of about 50 μm to about 80 μm.

Although four cores 102 are shown in the illustrated examples, the scope of the disclosure is not so limited. Rather, in other implementations, the MCFs 100A-100B can include fewer cores 102 or more than four cores 102. In certain embodiments, the diameter of each core 102 can be from about 50 μm to about 80 μm. In certain embodiments, the centers of any two cores 102 can be from about 100 μm to about 150 μm from each other.

In certain embodiments, MCFs 100A-100B are non-illuminating MCFs. In such embodiments, while each of the cores 102 is adapted to conduct light, e.g., laser light, the outer cladding 101 is not configured to conduct light. In certain other embodiments, the MCFs 100A-100B may instead be illuminating MCFs. An illuminating MCF is one in which light for general illumination, as opposed to targeted laser light for treatment, is transmitted through the outer cladding 101 of the MCF, in order to provide general illumination at a treatment site. Thus, the outer cladding 101 can be utilized to transmit light therealong to provide general illumination, while the cores 102 are utilized to transmit laser light for treatment, at a treatment site.

During manufacturing of the MCFs 100A-100B, in certain cases, bubbles may form in the outer cladding 101, or other portions of the MCF, such as in the cores 102, at the inner cladding 103, and/or at the interface of the outer cladding 101, the cores 102, and/or the inner cladding 103. The bubble formation causes instabilities during the fiber draw, ultimately causing low yield of the fiber creation, and decreased functionality of the MCFs 100A-100B. In regards to MCF 100B, one reason for bubble formation is that the dopant concentration of the outer cladding 101 and the inner claddings 103 are different, and the concentration gradient causes dopants to move toward the outer cladding 101 and create bubbles. For example, if the inner claddings 103 of MCF 100B include fluorine-doped silica (SiO$_{3/2}$F), the fluorine-doped silica can spontaneously decompose into silicon dioxide (SiO$_2$) and gaseous silicon tetrafluoride (SiF$_4$). The silicon tetrafluoride may then form bubbles in the outer cladding 101 and/or at the interface between the outer cladding 101 and the inner cladding 103. In addition, the rough interface between the outer cladding 101 and each of the cores 102 may cause bubbles to form at the respective interface.

In regards to MCF 100A, bubbles may form due to the difference in the dopant concentration between the outer cladding 101 and the cores 102. For example, the germanium-doped cores 102 of MCF 100A may include germanium dioxide, which can decompose into germanium oxide (GeO) and oxygen gas (O$_2$). The oxygen gas may then form bubbles in the outer cladding 101 and/or at the interface between the outer cladding 101 and the core 102. Similar to MCF 100B, in MCF 100A, the rough interface between the outer cladding 101 and each of the inner claddings 103 may also cause bubbles to form at the respective interface.

In any case, reduction of these bubbles is desired in order to increase the yield of the MCF and improve its material and optical properties. Therefore, it is desirable to reduce the dopant gradient and dopant diffusion between the outer cladding 101 and the inner cladding 103, in the case of MCF 100B. It is similarly desirable to reduce the dopant gradient and dopant diffusion between the outer cladding and the cores 102 of MCF 100A.

Accordingly, a diffusion reduction feature is included in various embodiments of the disclosure for reducing unwanted migration of dopants to the outer cladding. In some embodiments, the diffusion reduction feature reduces diffusion of dopants between the core and/or the inner claddings to the outer cladding. Thus, in such embodiments, the concentration of the dopant in the outer cladding is reduced in comparison to an MCF without the diffusion reduction feature. In some embodiments, the diffusion reduction feature reduces a dopant concentration gradient of a dopant between the outer cladding and the core and/or the inner claddings. Thus, in such embodiments, the dopant concentration gradient between the outer cladding and the core and/or inner claddings is reduced in comparison to an MCF without the diffusion reduction feature.

Figure 2A:
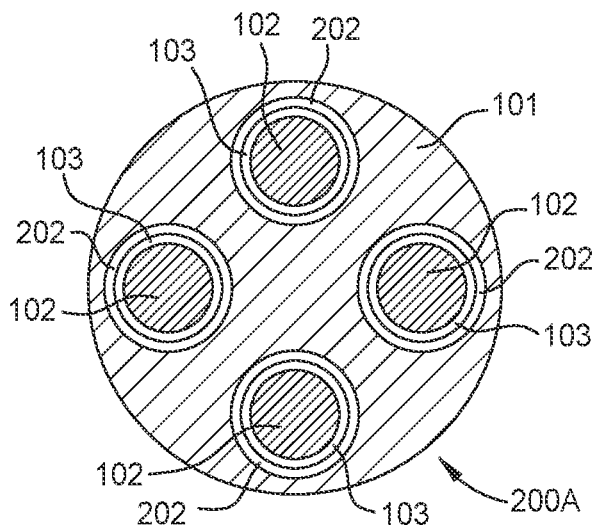
FIG. 2A illustrates a front cut-through view of a MCF with a plurality of diffusion barriers and a plurality of inner claddings, in accordance with a particular embodiment of the present disclosure.
Figure 2B:
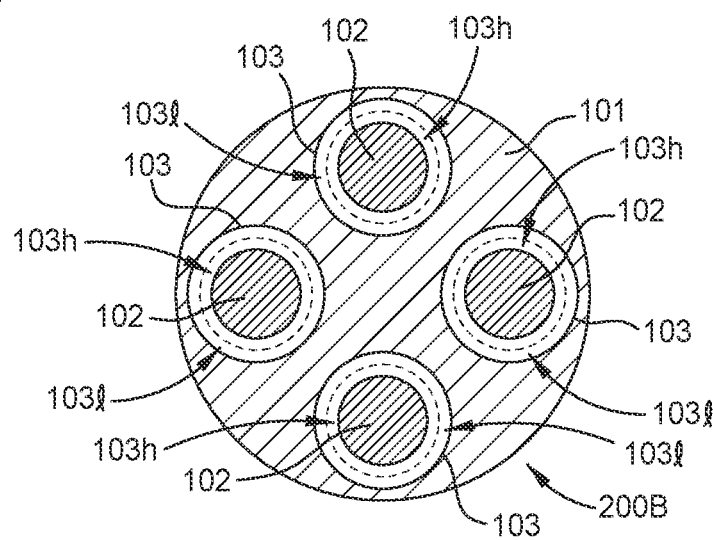
FIG. 2B illustrates a front cut-through view of a MCF with a plurality of inner claddings with different regions, in accordance with a particular embodiment of the present disclosure.
Figure 2C:
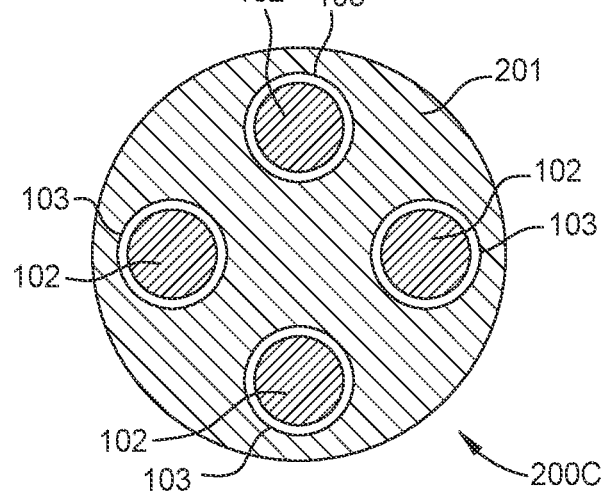
FIG. 2C illustrates a front cut-through view of a MCF with a plurality of inner claddings and doped outer cladding, in accordance with a particular embodiment of the present disclosure.
Figure 2D:
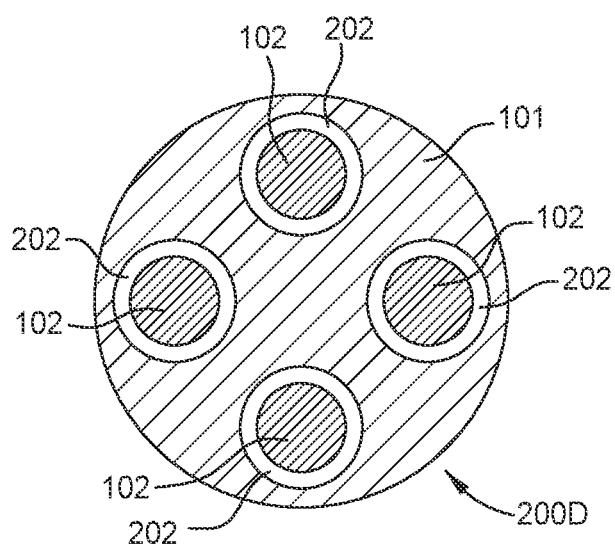
FIG. 2D illustrates a front cut-through view of a MCF with a plurality of diffusion barriers, in accordance with a particular embodiment of the present disclosure.

FIG. 2A-2F illustrate different diffusion reduction features. As described in relation to FIG. 2A, certain embodiments relate to reducing the diffusion of dopants between the inner cladding and the outer cladding, such as MCF 100B of FIG. 1C. In the embodiments of FIG. 2A, the diffusion reduction feature includes diffusion barriers. As described in relation to FIG. 2D, certain embodiments relate to reducing the diffusion of dopants between the core and the outer cladding, such as MCF 100A of FIG. 1B. In the embodiments of FIG. 2D, the diffusion reduction feature includes diffusion barriers. As described in relation to FIGS. 2B and 2C, certain embodiments relate to reducing the dopant gradient between the outer cladding and the inner claddings of a MCF, such as MCF 100B of FIG. 1C. In the embodiments of FIGS. 2B and 2C, the dopant reduction feature may include lightly-doped inner cladding regions, highly doped inner cladding regions, and/or a doped outer cladding. As described in relation to FIG. 2E, certain embodiments relate to reducing dopant gradient between the inner cladding and the tube. In these embodiments, the diffusion reduction feature may include a doped tube and a rod inner cladding. As described in relation to FIG. 2F, certain embodiments relate to reducing the diffusion of dopants between the cores and the tube. In these embodiments, the diffusion reduction feature may include diffusion barriers.

FIG. 2A illustrates a front cut-through view of a MCF 200A with a plurality of diffusion barriers 202 and a plurality of inner claddings 103, in accordance with a particular embodiment of the present disclosure. In the example of FIG. 2A, outer cladding 101 and cores 102 comprise non-doped fused silica while inner claddings 103 comprise doped fused silica (e.g., fluorine-doped fused silica). The diffusion barriers 202 at least partially surround the inner claddings 103. The diffusion barriers 202 include fused silica. In certain embodiments, the thickness of the diffusion barriers 202 vary from about 1 μm to about 10 μm. In this embodiment, the diffusion reduction feature includes the diffusion barriers 202. The diffusion barriers 202 reduce migration of dopants between the inner claddings 103 and the outer cladding 101, reducing the dopant gradient between the inner claddings 103 and the outer cladding 101, thus reducing bubble migration.

FIG. 2B illustrates a front cut-through view of a MCF 200B with a plurality of inner claddings 103 with different regions, in accordance with a particular embodiment of the present disclosure. Each of the inner claddings 103 include a highly-doped region 103h and a lightly-doped region 103l. The highly-doped region 103h has a higher concentration of dopants (e.g., F dopants) than the lightly-doped region 103l. The lightly-doped region 103l is doped such that the numerical aperture (NA) of the lightly-doped region with respect to the core 102 is from about 0.08 to about 0.18, and the highly-doped region 103h is doped such that the NA of the highly-doped region with respect to the core is from about 0.18 to about 0.28, according to some embodiments. The NA is given by the equation:

$$NA = \sqrt{n_{core}^2 + n_{region}^2}$$

where $n_{core}$ is the refractive index of the core, and $n_{region}$ is the refractive index of the region. The refractive index n depends on the dopant concentration of the material.

The thickness of the regions are from about 1 μm to about 10 μm, with a core diameter of about 50 μm to about 80 μm. In the example of FIG. 2B, the highly-doped region 103h of each inner cladding 103 helps with reducing the amount of laser light that escapes the respective core 102. In this embodiment, the diffusion reduction feature includes the lightly-doped region 103l and the highly doped region 103h, and the combination of the lightly-doped region and the highly-doped region of each cladding 103 also helps with reducing the bubble formation from the respective inner cladding 103, because there is a more gradual dopant gradient between the highly-doped region 103h, the lightly-doped region 103l, and the outer cladding 101.

FIG. 2C illustrates a front cut-through view of a MCF 200C with a plurality of inner claddings 103 and doped outer cladding 201, in accordance with a particular embodiment of the present disclosure. The outer cladding 201 is doped with a dopant including fluorine (F), boron (B), or chlorine (Cl). In some embodiments, the doped outer cladding 201 has a lower dopant concentration with respect to inner claddings 103, reducing the dopant gradient between the doped outer cladding and the inner claddings. In such embodiments, the NA of the doped outer cladding 201 with respect to the core 102 is from about 0.08 to about 0.18, and the NA of the inner cladding 103 with respect to the core 102 is from about 0.18 to about 0.28. In this embodiment, the diffusion reduction feature includes the doped outer cladding 201. The reduced dopant gradient between the doped outer cladding 201 and the inner claddings 103 reduces bubble migration between the doped outer cladding 201 and the inner claddings 103.

FIG. 2D illustrates a front cut-through view of a MCF 200D with a plurality of diffusion barriers 202, in accordance with a particular embodiment of the present disclosure. In the example of FIG. 2D, the cores 102 are doped with a dopant that increases the refractive index of the cores, thereby enabling light guiding properties within cores 102. The dopant includes any dopants that increase the refractive index of the cores 102, such as germanium (Ge) or phosphorus (P), according to some embodiments. As such, in the example of FIG. 2D, the inner claddings 103 are not necessary, as the doped cores 102 are able to produce the refractive index gradient with surrounding material (e.g., the is outer cladding 101), and thereby enable light guiding properties of the cores. In this embodiment, the diffusion reduction feature includes the diffusion barriers 202. In the example of FIG. 2D, the outer cladding 101 may comprise fused silica. Therefore, in order to prevent bubbles from forming in the outer cladding 101, in the embodiments of FIG. 2D, diffusion barriers 202 made of the same material as the outer cladding 101 are utilized to create a dopant diffusion barrier and reduce bubble formation in the interface to the outer cladding 101.

Figure 2E:
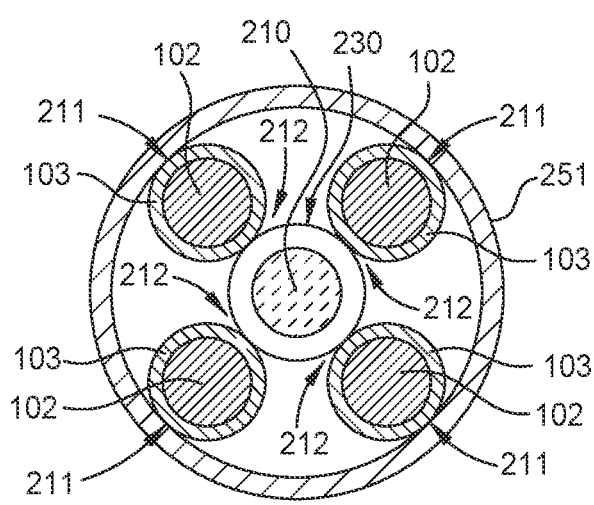
FIG. 2E illustrates a front cut-through view of a MCF with a glass rod and a rod inner cladding, in accordance with a particular embodiment of the present disclosure.

FIG. 2E illustrates a front cut-through view of a MCF 250A with a rod 210 and a rod inner cladding 230, in accordance with a particular embodiment of the present disclosure. In the example of FIG. 2E, each of the cores 102 includes fused silica or similar material while the inner claddings 103 include fused silica that is doped with a dopant including F, B, or Cl. The rod 210 is surrounded by a rod inner cladding 230, and the rod includes fused silica, glass, or a similar material. A first portion 211 of each of the inner claddings 103 interfaces with the inner surface of a tube 251 that surrounds all the core 102. Also, a second portion 212 of each of the inner claddings 103 interfaces with the rod inner cladding 230. In the example of FIG. 2E, in order to reduce the dopant gradient between the outer shell 101 and the inner claddings 103, the tube 251 is doped with a dopant including F, B, or Cl. In addition, to reduce the dopant gradient between the glass rod 210 and the inner claddings 103, at the second portions 212, as shown, the rod inner cladding 230 surrounds the rod 210 as well. Because the rod inner cladding 230 has the same material as the inner claddings 103 that surround the cores 102, the likelihood of bubbles forming in the rod 210 is reduced. In contrast, if no rod inner cladding 230 is used around the rod 210, bubbles may form in the rod 210 because of the dopant gradient between the rod 210 and the inner claddings 103. In this embodiment, the diffusion reduction feature includes the doped tube 251 and the rod inner cladding 230.

Figure 2F:
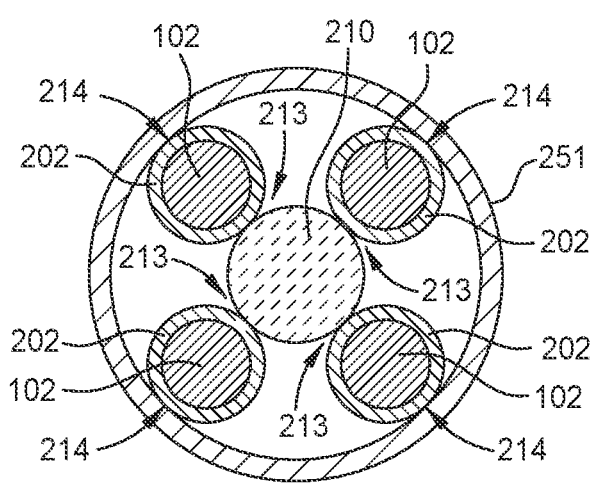
FIG. 2F illustrates a front cut-through view of a MCF with a glass rod, in accordance with a particular embodiment of the present disclosure.

FIG. 2F illustrates a front cut-through view of a MCF 250B with a rod 210, in accordance with a particular embodiment of the present disclosure. In the example of FIG. 2F, each of the cores 102 comprises fused silica or similar material, doped with a first dopant that increases the refractive index of the cores, such as germanium (Ge) or phosphorus (P). The diffusion barriers 202 comprise fused silica and surround the cores. A first portion 214 of each of the diffusion barriers 202 interfaces with the inner surface of the tube 251. Also, a second portion 213 of each of the diffusion barriers 202 interfaces with the rod 210. In the example of FIG. 2F, in order to reduce the dopant gradient between the tube 251 and the cores 102, the diffusion barriers 202 have the same composition of the outer shell. In the example of FIG. 2F, the tube 251 may comprise fused silica. Therefore, in order to prevent bubbles from forming in the tube 251, in the embodiments of FIG. 2F, the diffusion barriers 202 are made of the same material as the tube 251 to reduce the dopant gradient between the doped cores 102 and the tube 251. In this embodiment, the diffusion reduction feature includes the diffusion barriers 202.

As described above, a MCF includes one or more of a plurality of cores, an outer shell, diffusion barriers, claddings, and dopants. The diffusion barriers and claddings at least partially surround the cores. The diffusion barriers and claddings are designed so that unwanted migration of dopants from the inner claddings to the outer claddings or the tube are reduced. The doping levels of the various components of the MCF can be controlled in order to reduce dopant migration. In some embodiments, the inner cladding is undoped, and the core is doped instead, removing the need to dope the inner cladding.

The reduction in dopant gradients reduces the migration of dopants and possibility of bubble formation in the interfaces between the cores and the outer cladding or the tube. In addition, the claddings and diffusion barriers help slow and reduce migration of dopants between various components of the MCF. The type of dopant and dopant profile can be tuned to maintain desired material and optical properties of the MCF.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A multi-core optical fiber (MCF), comprising:
   a plurality of cores comprising a first material;
   an outer cladding surrounding the cores, the outer cladding comprising the first material;
   a diffusion reduction feature, wherein the diffusion reduction feature reduces migration of a first dopant between the outer cladding and another element in the MCF; and
   a plurality of inner claddings surrounding the cores, the plurality of inner claddings including the first material and the first dopant.

2. The MCF of claim 1, wherein a concentration of the first dopant in the outer cladding is reduced in comparison to an MCF without the diffusion reduction feature.

3. The MCF of claim 1, wherein a dopant concentration gradient between the outer cladding and the another element is reduced in comparison to an MCF without the diffusion reduction feature.

4. The MCF of claim 1, wherein the diffusion reduction feature comprises a plurality of diffusion barriers surrounding the inner claddings, the diffusion barriers comprising the first material.

5. The MCF of claim 1, wherein the diffusion reduction feature comprises:
   a highly-doped region of e plurality of inner claddings doped with the first dopant; and
   a lightly-doped region of the plurality of inner claddings doped with the first dopant, wherein a dopant concentration of the first dopant of the lightly doped region is lower than the dopant concentration of the first dopant of the highly-doped region, the lightly-doped region surrounding the highly-doped region.

6. The MCF of claim 5, wherein a numerical aperture (NA) of the highly-doped region with respect to the plurality of cores is from about 0.18 to about 0.28, and the NA of the lightly-doped region with respect to the plurality of cores is from about 0.08 to about 0.18.

7. The MCF of claim 6, wherein the first dopant comprises fluorine (F), boron (B), or chlorine (Cl).

8. The MCF of claim 1, wherein the diffusion reduction feature comprises the outer cladding with a first dopant concentration.

9. The MCF of claim 8, wherein the concentration of the first dopant in the outer cladding is less than the concentration of the first dopant in the plurality of inner claddings.

10. The MCF of claim 1, wherein the diffusion reduction feature comprises a plurality of diffusion barriers surrounding the cores, the diffusion barriers comprising the first material.

11. The MCF of claim 10, wherein the plurality of cores are doped with the first dopant, and the another element is the plurality of cores.

12. The MCF of claim 11, wherein the first dopant increases a refractive index of the first material.

13. The MCF of claim 12, wherein the first dopant comprises germanium (Ge) or phosphorus (P).

14. A multi-core optical fiber (MCF), comprising:
a rod comprising a first material;
a rod inner cladding surrounding the rod, the rod inner cladding including the first material and a first dopant;
a plurality of cores comprising the first material;
a plurality of inner claddings surrounding the cores, the plurality of inner claddings comprising the first material and the first dopant, a first portion of each of the plurality of inner claddings interfacing with a portion of the rod inner cladding; and
an outer tube comprising the first material and the first dopant, a second portion of each of the inner claddings interfacing with a portion of the outer tube.

15. The MCF of claim 14, wherein the first dopant comprises F, B, or Cl.

16. The MCF of claim 14, wherein a concentration gradient of the first dopant between the outer tube and the rod is reduced in comparison to an MCF without the rod inner cladding.

17. A multi-core optical fiber (MCF), comprising:
a rod comprising a first material;
a plurality of cores comprising the first material and a first dopant;
a plurality of diffusion barriers surrounding the cores, the diffusion barriers comprising the first material, a first portion of each of the diffusion barriers interfacing with a portion of the rod; and
an outer tube comprising the first material, a second portion of each of the diffusion barriers interfacing with a portion of the outer tube.

18. The MCF of claim 17, wherein the first dopant includes Ge or P.

19. The MCF of claim 18, wherein a gradient of the first dopant between the outer tube and the plurality of cores is reduced in comparison to an MCF without the plurality of diffusion barriers.

* * * * *